US010234744B2

(12) United States Patent
Zhong et al.

(10) Patent No.: US 10,234,744 B2
(45) Date of Patent: Mar. 19, 2019

(54) PERIODICALLY POLED CRYSTAL AND OPTICAL PARAMETRIC AMPLIFIER

(71) Applicant: SHENZHEN UNIVERSITY, Shenzhen, Guangdong (CN)

(72) Inventors: Haizhe Zhong, Guangdong (CN); Ying Li, Guangdong (CN); Changwen Xu, Guangdong (CN); Jianlong Yang, Guangdong (CA); Shiwei Wang, Guangdong (CN); Dianyuan Fan, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 15/950,156

(22) Filed: Apr. 10, 2018

(65) Prior Publication Data

US 2018/0231869 A1    Aug. 16, 2018

Related U.S. Application Data

(63) Continuation of application No. PCT/CN2017/070898, filed on Jan. 11, 2017.

(51) Int. Cl.
*G02F 1/355*     (2006.01)
*G02F 1/39*      (2006.01)

(52) U.S. Cl.
CPC .......... *G02F 1/3558* (2013.01); *G02F 1/3551* (2013.01); *G02F 1/39* (2013.01); *G02F 2001/392* (2013.01); *G02F 2202/07* (2013.01)

(58) Field of Classification Search
CPC .......................... G02F 1/3558; G02F 2207/07
See application file for complete search history.

(56) References Cited

U.S. PATENT DOCUMENTS

| | | | | |
|---|---|---|---|---|
| 8,508,841 | B2 * | 8/2013 | Chou | G02F 1/3501 359/328 |
| 2005/0195473 | A1 * | 9/2005 | Nee | G02F 1/3558 359/333 |
| 2006/0233206 | A1 * | 10/2006 | Miner | G02F 1/3558 372/22 |
| 2008/0044147 | A1 * | 2/2008 | Patel | G02F 1/3558 385/122 |
| 2018/0231869 | A1 * | 8/2018 | Zhong | G02F 1/3558 |

* cited by examiner

*Primary Examiner* — Rhonda S Peace

(57) ABSTRACT

The present invention belongs to the technical field of lasers, and particularly relates to a periodically poled crystal and an optical parametric amplifier. The present invention provides a periodically poled crystal, including a first nonlinear region, a linear region and a second nonlinear region, wherein the first nonlinear region and the second nonlinear region both have periodically poled structures. The optical parametric amplifier having the periodically poled crystal can separate the idler wave from the signal wave besides achieving the basic function of optical parametric amplification because the by-produced idler wave transmits in a direction different from the directions that the signal wave and the pump wave transmit, and therefore the energy reflow is suppressed when the optical parametric amplifier has reached saturated amplification, and the performance of the optical parametric amplifier is significantly improved.

9 Claims, 4 Drawing Sheets

PERIODICALLY POLED CRYSTAL AND OPTICAL PARAMETRIC AMPLIFIER

CROSS-REFERENCE TO RELATED APPLICATIONS

The present application is a Continuation Application of PCT application No. PCT/CN2017/070898 filed on Jan. 11, 2017, the contents of which are hereby incorporated by reference.

TECHNICAL FIELD

The present invention belongs to the technical field of lasers, and particularly relates to a periodically poled crystal and an optical parametric amplifier.

BACKGROUND

An optical parametric amplifier (OPA), as an important optical device in the technical field of lasers, is widely used in fields such as scientific research, medicine and industrial engineering etc. The work principle of OPA is to emit a high-frequency laser beam $\omega p$ and a low-frequency laser beam $\omega s$ into a nonlinear medium simultaneously. Energy of the high-frequency laser beam $\omega p$ is transferred onto the low-frequency laser beam $\omega s$ due to a difference frequency effect therebetween, so that the low-frequency laser is amplified, and a third laser beam termed as idler wave with a frequency $\omega i$ is obtained, wherein $\omega p > \omega s$, and $\omega p = \omega s + \omega i$, wherein $\omega p$ is generally termed as pump wave, and $\omega s$ is generally termed as signal wave.

However, all parametric processes will be subject to backconversion, which means that the energy will reflow from the signal wave and the idler wave towards the pump wave when the pump wave decays strongly and the parametric processes go into saturated amplification. Therefore, such an energy reflow effect greatly limits the ultimate performance of the optical parametric amplifier.

SUMMARY

Technical Problem

The present invention provides a periodically poled crystal and an optical parametric amplifier, aiming at solving the problem of backconversion in an existing optical parametric amplifier.

Technical Solution

To solve the above technical problem, the present invention provides a periodically poled crystal.

The periodically poled crystal includes a first nonlinear region, a linear region and a second nonlinear region, wherein the first nonlinear region, the linear region and the second nonlinear region are connected in sequence, and the first nonlinear region and the second nonlinear region both have periodically poled structures.

Preferably, an included angle between a periodically poling direction of the first nonlinear region and a laser transmission direction is $\beta$, and an included angle between a periodically poling direction of the second nonlinear region and the laser transmission direction is $-\beta$, so that the periodically poled structure of the first nonlinear region and the periodically poled structure of the second nonlinear region are axisymmetric along the laser transmission direction.

Preferably, the included angle $\beta$ is set based on a mapping relationship between a preset included angle $\beta$ and a poling period of the periodically poled crystal as well as the poling period of the periodically poled crystal.

The present invention further provides an optical parametric amplifier, which includes the above periodically poled crystal.

The periodically poled crystal is configured to amplify incident signal wave based on incident pump wave and generate idler wave; and to separate the idler wave from the signal wave and the pump wave to suppress energy reflow after the optical parametric amplifier has reached saturated amplification, that is, suppress the energy from reflowing towards the pump wave from the signal wave and the idler wave.

Preferably, the pump wave and the signal wave irradiate on the periodically poled crystal in collinear.

Preferably, the first nonlinear region of the periodically poled crystal is configured to cause the first generated idler wave strays away from one side of the signal wave and the pump wave, and the second nonlinear region is configured to cause the second generated idler wave strays away from the other side of the signal wave and the pump wave.

Preferably, an included angle $\alpha$ is set based on a mapping relationship between a preset included angle $\alpha$ and a poling period of the periodically poled crystal as well as the poling period of the periodically poled crystal, wherein the included angle $\alpha$ represents an included angle between transmission directions of the idler wave and the signal wave or the pump wave.

Preferably, the optical parametric amplifier further includes a laser device, an optical coupler, and an optical splitter, wherein the laser device is configured for emitting the pump wave; the optical coupler is configured for spatially coupling the pump wave and the signal wave and irradiate them on the periodically-poled crystal; and the optical splitter is configured for separating the amplified signal wave from a residual pump wave.

Preferably, an effective walk-off length of the idler wave is set based on a mapping relationship between a preset actual walk-off length of the idler wave and a spot size of the signal wave as well as the spot size of the pump wave.

Preferably, periodically poled structures of the periodically poled crystal is capable of forming a wave-vector quadrangle with the wave vectors of kp, ks, ki and kg, wherein the ks represents a wave vector of the signal wave, the kp represents a wave vector of the pump wave, the ki represents a wave vector of the idler wave, the kg represents a reciprocal lattice vector of the periodically poled crystal, and the ks is collinear with the kp.

Advantageous Effects

Compared with the prior art, the present invention has the following beneficial effects:

the present invention provides a periodically poled crystal, including a first nonlinear region, a linear region and a second nonlinear region, wherein the first nonlinear region and the second nonlinear region both have periodically poled structures. The optical parametric amplifier having the periodically poled crystal can separate the idler wave from the signal wave besides achieving the basic function of optical parametric amplification because the by-produced idler wave transmits in a direction different from the directions that the incident signal wave and the pump wave transmit, and therefore the energy reflow is suppressed when the optical parametric amplifier has reached the saturated amplification, and the performance of the optical parametric amplifier is significantly improved.

DESCRIPTION OF THE EMBODIMENTS

In order to make objectives, technical solutions and advantages of the present invention more comprehensible, the present invention will be further described in detail below with reference to accompanying drawings and embodiments. It should be understood that specific embodiments described herein are merely used to explain the present invention, and are not intended to limit the present invention.

Figure 1:
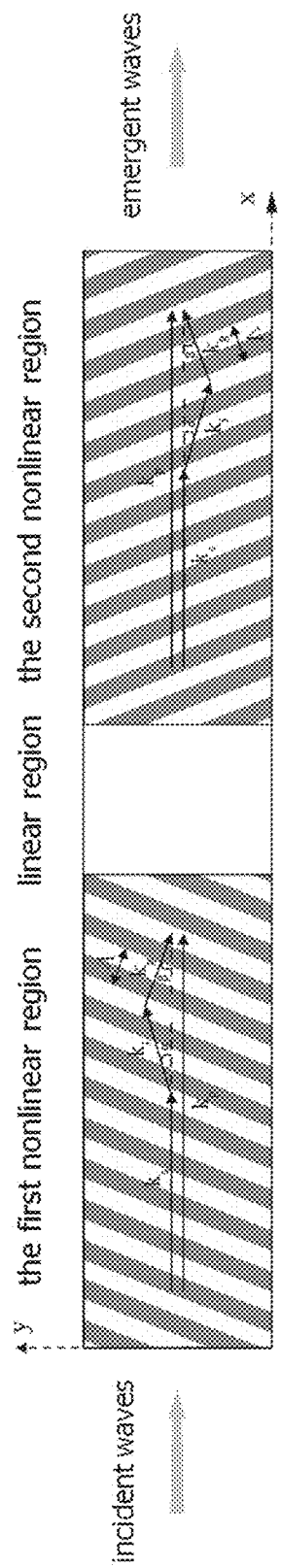
FIG. 1 is a schematic diagram showing a periodically poled crystal according to an embodiment of the present invention.

As a first embodiment of the present invention, as shown in FIG. 1, the present invention provides a periodically poled crystal.

The periodically poled crystal includes a first nonlinear region, a linear region and a second nonlinear region, which are connected in sequence. The first nonlinear region and the second nonlinear region are both of periodically poled structures.

Further, an included angle between a periodically poling direction of the first nonlinear region and a laser transmission direction is $\beta$, and an included angle between a periodically poling direction of the second nonlinear region and the laser transmission direction is $-\beta$, so that the periodically poled structure of the first nonlinear region and the periodically poled structure of the second nonlinear region are axisymmetric along the laser transmission direction.

Further, the included angle $\beta$ is set based on a mapping relationship between a preset included angle $\beta$ and a poling period of the periodically poled crystal as well as the poling period of the periodically poled crystal.

As shown in FIG. 1, regions in black-and-white shown in FIG. 1 represent the first nonlinear region and the second nonlinear region, respectively, and a white region represents the linear region. ks represents a wave vector of a signal wave, kp represents a wave vector of the pump wave, and ki represents a wave vector of the generated idler wave. Since the signal wave and the pump wave irradiate on the periodically poled crystal in collinear, then the ks is collinear with the kp. kg represents a reciprocal lattice vector of the periodically poled crystal, which is a wave vector brought by the poled structure of the periodically poled crystal, a size of which is related to a poling period of the periodically poled crystal, that is, the size of the kg depends on a periodically poling period of the nonlinear region: kg=$2\pi/\Lambda$. $\Lambda$ represents the poling period of the periodically poled crystal, and $\alpha$ represents an included angle between transmission directions of the idler wave and the signal wave or the pump wave.

It is to be noted that four wave vectors of the periodically poled crystal, i.e., ks, kp, ki and kg are required to form a wave-vector quadrangle, thereby achieving quasi-phase matching and further having capabilities of energy conversion. Since the ks is collinear with the kp, the difference between kp and ks, ki and kg are required to form a wave-vector triangle. Under a premise that the ks, the kp and the ki are determined, namely, under a premise that laser wavelengths of the pump wave, the signal wave and the idler wave participating in parametric amplification are known, the parameters $\alpha$, $\beta$ and kg have a mapping relationship with each other, and once one of the parameters is determined, the other two parameters are determined accordingly.

The periodically poled crystal may be made by the following two methods.

The first method is as follows: a crystal is polarized based on a predetermined polarization method, so that the crystal possesses polarized regions with periodically poled structures at two ends, and a non-polarized region without the periodically poled structure in the middle, wherein the polarized regions at two ends are respectively the first nonlinear region and the second nonlinear region, and the non-polarized region is the linear region.

The second method is as follows: the periodically poled crystal is formed by arranging a first nonlinear crystal with the first periodically poled structure and a second nonlinear crystal with the second periodically poled structure, wherein the first nonlinear crystal forms the first nonlinear region, the second nonlinear crystal forms the second nonlinear region, and a space interval between the first nonlinear crystal and the second nonlinear crystal forms the linear region.

In summary, the periodically poled crystal provided by the first embodiment of the present invention may have a required periodically poled structure obtained by appropriate polarization treatments, and the fabrication method is simple. The periodically poled crystal, when is applied to an optical parametric amplifier, can separate the generated idler wave from the signal wave, so as to avoid an influence of the idler wave on the signal wave and suppress the energy reflow when the optical parametric amplifier has reached saturated amplification.

Figure 2:
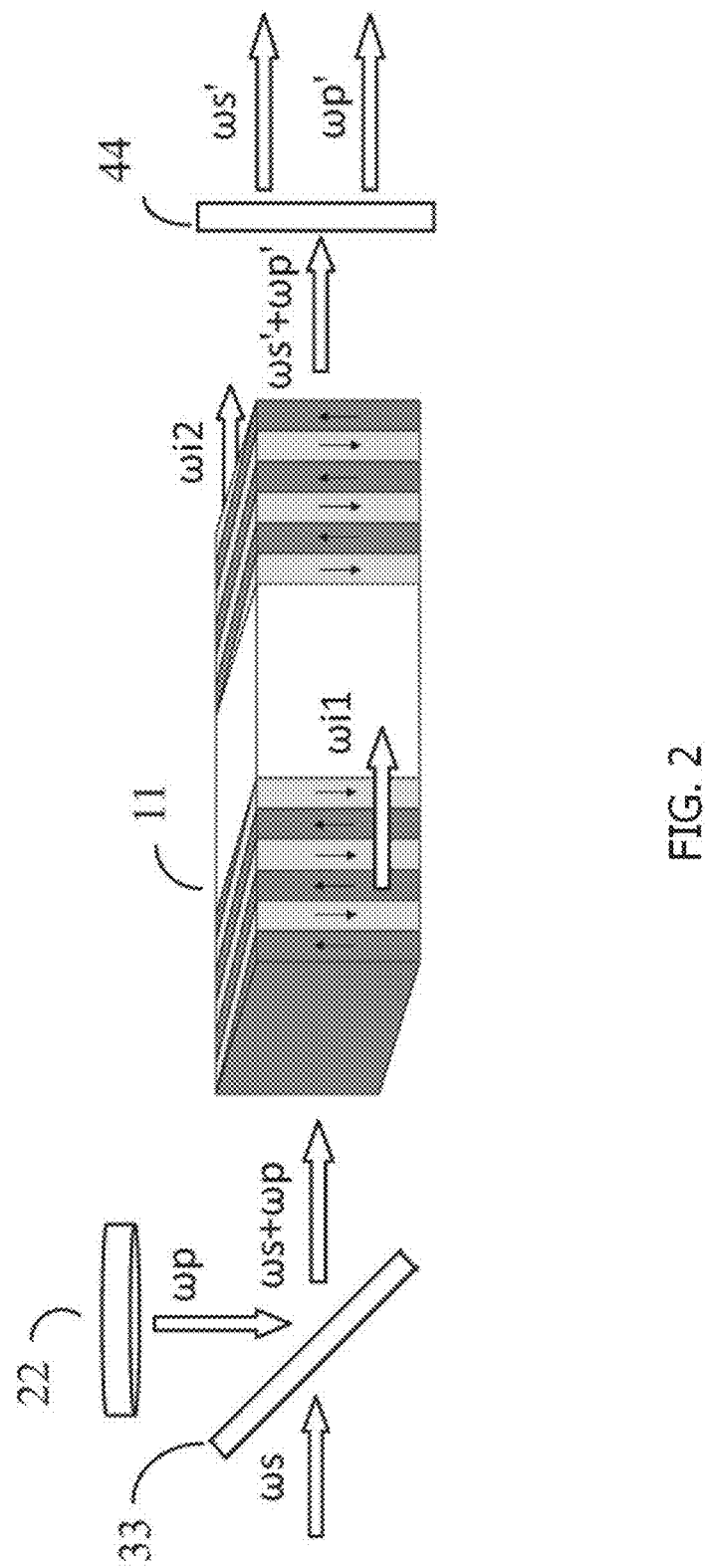
FIG. 2 is a schematic diagram showing an optical parametric amplifier according to an embodiment of the present invention.
Figure 3:
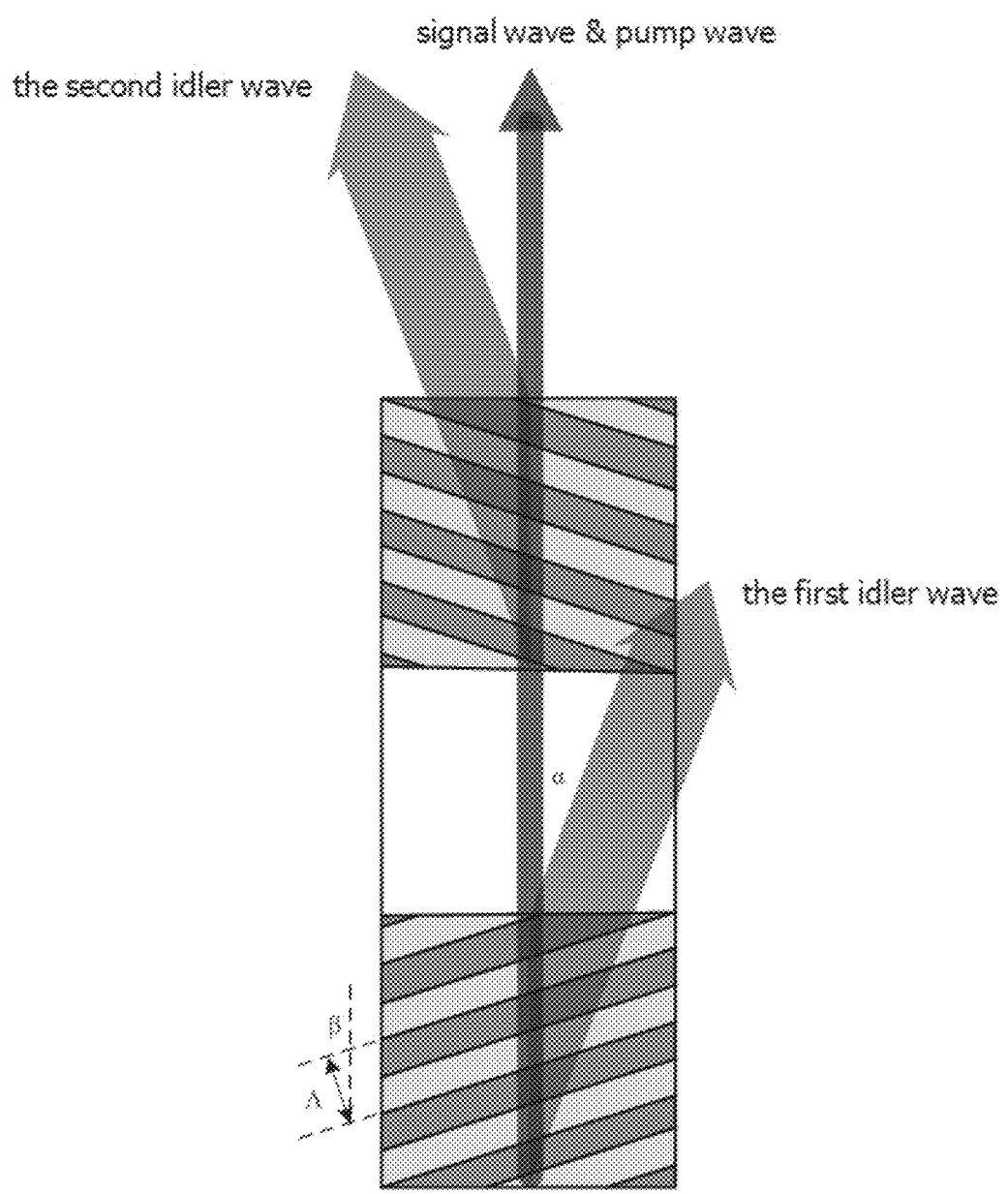
FIG. 3 is a plan view showing a periodically poled crystal in an optical parametric amplifier according to an embodiment of the present invention.

As a second embodiment of the present invention, as shown in FIG. 2 and FIG. 3, the present invention provides an optical parametric amplifier including the periodically poled crystal 11 provided by the first embodiment of the present invention, a laser device 22, an optical coupler 33 and an optical splitter 44.

The laser device 22 is configured to emit pump wave $\omega p$; and in the present embodiment, the laser device 22 is a pulsed laser. In the optical parametric amplifier, the pump wave refers to a laser beam that provides energy, namely, the laser beam with the highest frequency.

The optical coupler 33 is configured to spatially couple the pump wave $\omega p$ and incident signal wave $\omega s$ and irradiate them on the periodically poled crystal 11; and in the present embodiment, the optical coupler 33 is an optical coupling mirror.

The periodically poled crystal 11 is configured to amplify the incident signal wave $\omega s$ by utilizing the incident pump wave $\omega p$ and generate the idler wave $\omega i$; and to separate the idler wave ωi from the signal wave ωs and the pump wave ωp so as to suppress the energy reflow when the optical parametric amplifier has reached saturated amplification, that is, suppress an energy from reflowing towards the pump wave from the signal wave and the idler wave.

The optical splitter 44 is configured to separate the amplified signal wave ωs' from the residual pump wave ωp'. The optical splitter 44 may be a prism or may be a dichroic mirror that is able to separate mixed waves of different wavelengths from each other.

Among them, the pump wave ωp and the signal wave ωs irradiate on the periodically poled crystal 11 in collinear. Therefore, the pump wave ωp and the signal wave ωs have the same transmission direction.

Among them, the periodically poled structures of the periodically poled crystal 11 have capabilities of forming a wave-vector quadruple with the wave vectors of ks, kp, ki and kg, wherein the ks represents a wave vector of the signal wave, the kp represents a wave vector of the pump wave, the ki represents a wave vector of the idler wave, the kg represents a reciprocal lattice vector of the periodically poled crystal, and the ks is collinear with the kp.

Further, the first nonlinear region of the periodically poled crystal 11 is configured to cause the first generated idler wave ωi1 strays away from one side of the signal wave and the pump wave, and the second nonlinear region is configured to cause the second generated idler wave ωi2 strays away from the other side of the signal wave and the pump wave. The first idler wave ωi1 is generated when the signal wave and the pump wave pass through the first nonlinear region; and the second idler wave ωi2 is generated when the signal wave and the pump wave pass through the second nonlinear region. As shown in FIG. 3, the first idler wave ωi1 will transmit in a direction deviating from the signal wave and the pump wave by an angle α due to the periodically poled structure of the first nonlinear region. There is no periodically poled structure in the linear region, which is only configured to isolate the idler wave and ensure that only the signal wave and the pump wave enter the second nonlinear region. The second idler wave ωi2 will transmit in a direction deviating from the signal wave and the pump wave by an angle $-\alpha$ due to the periodically poled structure of the second nonlinear region. Transmission directions of the first idler wave and the second idler wave are located on the left side and the right side of the periodically poled crystal 11, respectively, may be left first and right later, or may be right first and left later, which depends on the periodically poled structures of the first nonlinear region and the second nonlinear region.

Further, an included angle α is set based on a mapping relationship between a preset included angle α and a poling period of the periodically poled crystal as well as the poling period of the periodically poled crystal, wherein the included angle α represents an included angle between transmission directions of the idler wave and the signal wave or the pump wave. As the parameters α, β and kg have a mapping relationship with each other, once one of the parameters is determined, the other two parameters are determined accordingly. That is, the angle between the transmission directions of the idler wave and the signal wave or the pump wave may be adjusted based on the poling period of the periodically poled crystal. In the present embodiment, α represents the included angle between the transmission directions of the first idler wave and the signal wave or the pump wave, $-\alpha$ represents the included angle between the transmission directions of the second idler wave and the signal wave or the pump wave, kg represents a reciprocal lattice vector of the periodically poled crystal 11, a size of which is related to the poling period of the periodically poled crystal 11, and β represents an included angle between a periodically poling direction of the first nonlinear region of the periodically poled crystal 11 and a laser transmission direction, $-\beta$ represents an included angle between a periodically poling direction of the second nonlinear region of the periodically poled crystal 11 and the laser transmission direction, and $0° \leq \beta \leq 90°$.

Further, an effective walk-off length of the idler wave is set based on a mapping relationship between a preset actual walk-off length of the idler wave and a spot size of the signal wave as well as the spot size of the pump wave. The effective walk-off length of the idler wave can be adjusted by adjusting the spot size of the incident signal wave or the pump wave. The greater the effective walk-off length is, the smaller an influence on the optical parametric amplifier by the energy reflow is.

According to a simulation experiment, it is concluded that the optical parametric amplifier can effectively suppress backconversion, so that the energy conversion efficiency can be almost up to 100%. However, in the prior art, in order to avoid the occurrence of the reflow, various optimization designs are generally adopted to achieve higher energy conversion as much as possible before the reflowing occurs, or a complex spatiotemporal pulse shaping technology is used to make energies of the signal wave and the pump wave be uniformly distributed, which have a highest energy conversion efficiency of only nearly 65%.

In summary, when optical parametric amplifier provided by the second embodiment of the present invention is employed, the idler wave as a "byproduct" transmits together with the incident signal wave and the pump wave in different directions, so that the separation of the idler wave from the signal wave is realized, and thereby the energy reflow is suppressed when the optical parametric amplifier goes into the saturated amplification, and the performance of the optical parametric amplifier is significantly improved. Moreover, the optical parametric amplifier is simple in structure, and easy to operate due to no need of a complex optical path.

As a third embodiment of the present invention, the optical parametric amplifier in the present embodiment includes a pulsed laser, an optical coupler, a periodically poled crystal, and an optical splitter.

The signal wave is 800 nm titanium-sapphire pulsed laser. A 532 nm pulsed laser is selected as the pulsed laser. 532 nm pulsed laser emitted from the 532 nm pulsed laser passes through the optical coupler and enters the periodically poled crystal along with the 800 nm titanium-sapphire pulsed laser. The titanium-sapphire pulsed laser is amplified by the 532 nm pulsed laser which serves as the pump wave.

The periodically poled crystal makes an idler wave newly generated in an optical parametric amplification process transmit in a transmission direction different from that of the signal wave or the pump wave. The periodically poled crystal includes a first nonlinear region, a linear region and a second nonlinear region connected in sequenced. The first nonlinear region and the second nonlinear region both have periodically poled structures. An included angle between a periodically poling direction of the first nonlinear region and a laser transmission direction is β, and an included angle between a periodically poling direction of the second nonlinear region and the laser transmission direction is $-\beta$, such that a periodically poled structure of the first nonlinear region and a periodically poled structure of the second nonlinear region are axisymmetric along the laser transmission direction. In general, the length of the linear region of the periodically poled crystal is set to about 10 mm, and the linear region serves only as a linear transmission region without any periodically poled structure. A value of β is determined according to actual needs, and a value of β is inter-related to a poling period Λ of the periodically poled crystal. In the present embodiment, the periodically poled crystal is a 5% MgO doped periodically poled lithium niobate crystal (MgO:PPLN) which meets type-0 quasi-phase matching. A working temperature is set to 24.5 t. As shown in FIG. 3, the included angle β between its periodically poling direction and the laser transmission direction is 52 degrees. Under such conditions, in order to meet the type-0 quasi-phase matching, the poling period of the periodically poled crystal Λ is 4.25 μm, and the corresponding included angle α between the transmission direction of the idler wave and the transmission direction of the signal wave or the pump wave is approximately 8 degrees. It is to be noted that, if β is different, then the required poling period Λ is different as well. Particularly, assuming that a spot diameter of the 800 nm titanium-sapphire pulsed laser is 0.5 mm, the total length of the nonlinear region of the MgO:PPLN crystal is 10 mm, and lengths of the first nonlinear region and the second nonlinear region are both 5 mm, and accordingly, an effective walk-off length (actual walk-off length/spot diameter) of the idler wave in the first nonlinear region or the second nonlinear region is approximately 1.4.

Figure 4:
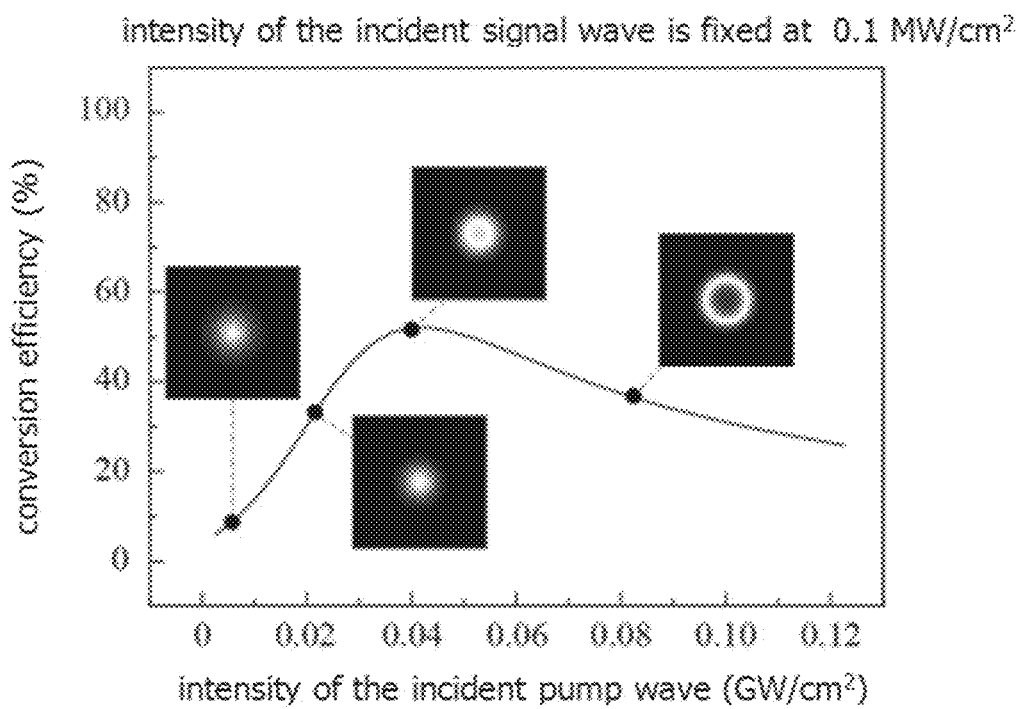
FIG. 4 is a schematic diagram of a curve showing a conversion efficiency of a parametric amplifier in the prior art varies with intensity of pump wave.
Figure 5:
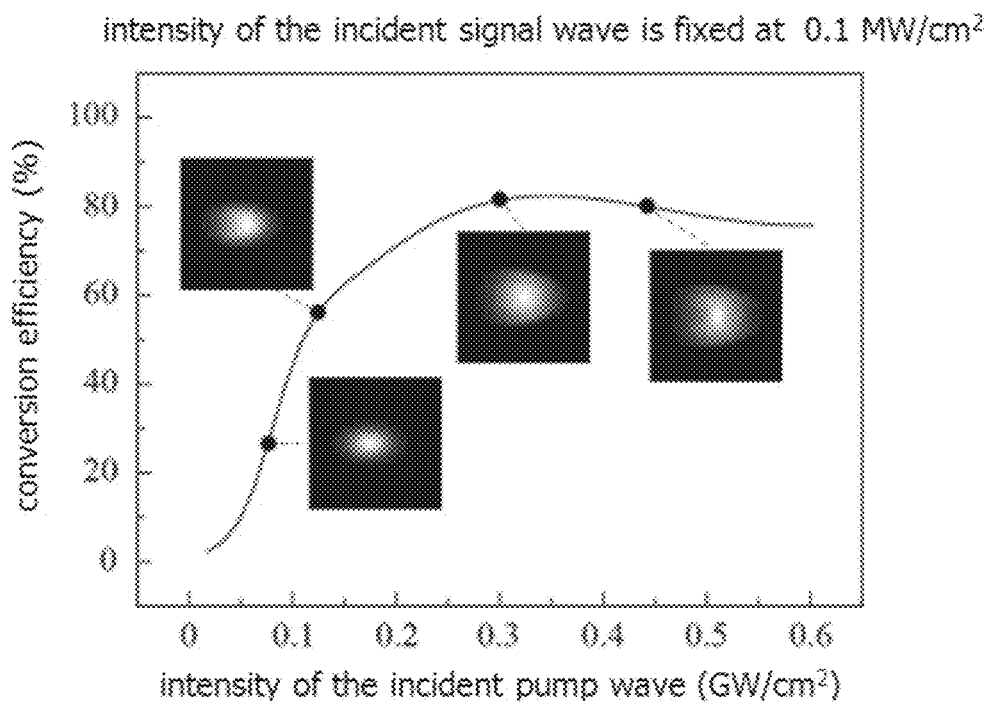
FIG. 5 is a schematic diagram of a curve showing a conversion efficiency of an optical parametric amplifier based on a periodically poled crystal according to an embodiment of the present invention varies with intensity of pump wave.

As shown in FIG. 4 and FIG. 5, curves of a conversion efficiency and a corresponding amplified signal-beam profile of an optical parametric amplifier varies with intensity of the pump wave under two different phase matching conditions are given respectively. FIG. 4 shows an output result of an optical parametric amplifier according to the prior art, and FIG. 5 shows an output result of an optical parametric amplifier according to the present invention. As can be seen from the comparison of these two figures, as the pump intensity increases, the optical parametric amplifier based on an existing collinear phase matching technology will enter saturated amplification when a relatively high quantum conversion efficiency (generally ~45%) is reached which exhibits that the conversion efficiency will reduce as the pump intensity keeps increasing. In the meanwhile, due to uneven spatial intensity distribution, a spot center of the signal wave will first enter the saturated amplification. Due to an inverse process of parametric amplification, that is, the appearance of sum-frequency mixing, energy of the amplified signal wave begins to reflow. However, a peripheral part of the spot with relatively lower energy growth speed has not yet been fully amplified, resulting in severe distortion of the spot of the amplified signal wave which appears as a circular spot. In contrast, as shown in FIG. 5, the output spot of the amplified signal wave of the optical parametric amplifier provided by the present invention is substantially kept within an acceptable degree over the entire pump intensity range. Moreover, its highest quantum efficiency approaching 80% is almost twice that of the prior art.

As a fourth embodiment of the present invention, the optical parametric amplifier in the present embodiment includes a pulsed laser, an optical coupler, a periodically poled crystal, and an optical splitter. In the present embodiment, optical parametric amplification is performed on a 3.4 μm mid-infrared signal wave pumped by a 1064 nm near-infrared pulsed laser.

A 1064 nm pulsed laser is selected as the pulsed laser, 1064 nm pulsed laser emitted from the 1064 nm pulsed laser passes through the optical coupler and then goes into the periodically poled crystal provided by the present invention together with the 3.4 μm mid-infrared pulsed laser. The 3.4 μm mid-infrared pulsed laser is amplified by the 1064 nm pulsed laser which serves as the pump wave.

In the present embodiment, the periodically poled crystal is a 5% MgO doped periodically poled lithium niobate crystal (MgO:PPLN) that meets type-0 quasi-phase matching. A working temperature is set to 24.5° C. An included angle β between its periodically poling direction and a laser transmission direction is set to 77 degrees. Under this condition, in order to meet the type-0 quasi-phase matching, the poling period Λ of the periodically poled crystal is 4.4 μm, and the corresponding included angle α between a transmission direction of the idler wave and a transmission direction of the signal wave or the pump wave is approximately 9.3 degrees. Assuming that the spot diameter of 3.4 μm mid-infrared pulsed laser is 0.5 mm, the total length of the nonlinear region of the MgO:PPLN crystal is 10 mm, and lengths of the first nonlinear region and the second nonlinear region are both 5 mm, and accordingly, an effective walk-off length of the idler wave in the first nonlinear region or the second nonlinear region is approximately 1.6.

The above is only illustrative of preferred embodiments of the present invention, and not intended to limit the present invention. Any modifications, equivalent replacements and improvements made within the spirit and principle of the present invention should be included in a protection scope of the present invention.

What is claimed is:

1. A periodically poled crystal, comprising:
   a first nonlinear region;
   a linear region; and
   a second nonlinear region,
   wherein the first nonlinear region, the linear region and the second nonlinear region are connected in sequence; and
   wherein the first nonlinear region and the second nonlinear region both have periodically poled structures;
   wherein an included angle between a periodically poling direction of the first nonlinear region and a laser transmission direction is β, and an included angle between a periodically poling direction of the second nonlinear region and the laser transmission direction is −β, so that the periodically poled structure of the first nonlinear region and the periodically poled structure of the second nonlinear region are axisymmetric along the laser transmission direction.

2. The periodically poled crystal according to claim 1, wherein the included angle β is set based on a mapping relationship between a preset included angle β and a poling period of the periodically poled crystal as well as the poling period of the periodically poled crystal.

3. An optical parametric amplifier, comprising the periodically poled crystal according to claim 1, wherein the periodically poled crystal is configured to amplify incident signal wave based on incident pump wave and generate idler wave; and to separate the idler wave from the signal wave and the pump wave so as to suppress energy reflow when the optical parametric amplifier has reached saturated amplification.

4. The optical parametric amplifier according to claim 3, wherein the pump wave and the signal wave irradiate on the periodically poled crystal in collinear.

5. The optical parametric amplifier according to claim 4, wherein an included angle α is set based on a mapping relationship between a preset included angle α and a poling period of the periodically poled crystal as well as the poling period of the periodically poled crystal, wherein the included angle α represents an included angle between transmission directions of the idler wave and the signal wave or the pump wave.

6. The optical parametric amplifier according to claim 3, wherein the first nonlinear region of the periodically poled crystal is configured to cause the first generated idler wave strays away from one side of the signal wave and the pump wave, and the second nonlinear region is configured to cause the second generated idler wave strays away from an other side of the signal wave and the pump wave.

7. The optical parametric amplifier according to claim 3, further comprising:
   a laser device configured for emitting the pump wave;
   an optical coupler configured for spatially coupling the pump wave and the signal wave and irradiate the pump wave and the signal wave on the periodically poled crystal; and
   an optical splitter configured for separating the amplified signal wave from a residual pump wave.

8. The optical parametric amplifier according to claim 3, wherein an effective walk-off length of the idler wave is set based on a mapping relationship between a preset actual walk-off length of the idler wave and a spot size of the signal wave as well as the spot size of the pump wave.

9. The optical parametric amplifier according to claim 3, wherein periodically poled structures of the periodically poled crystal is capable of forming a wave-vector quadrangle with wave vectors of kp, ks, ki and kg, wherein the ks represents a wave vector of the signal wave, the kp represents a wave vector of the pump wave, the ki represents a wave vector of the idler wave, the kg represents a reciprocal lattice vector of the periodically poled crystal, and the ks is collinear with the kp.

* * * * *